(12) United States Patent
Zhang et al.

(10) Patent No.: US 12,341,627 B2
(45) Date of Patent: Jun. 24, 2025

(54) PACKET FRAGMENTATION IN GRE

(71) Applicant: Hewlett Packard Enterprise Development LP, Houston, TX (US)

(72) Inventors: Xueliang Zhang, Beijing (CN); Jishi Wang, Beijing (CN); Huimeng Huang, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 626 days.

(21) Appl. No.: 17/673,881

(22) Filed: Feb. 17, 2022

(65) Prior Publication Data
US 2023/0261900 A1    Aug. 17, 2023

(51) Int. Cl.
*H04L 12/46* (2006.01)
*H04L 45/74* (2022.01)

(52) U.S. Cl.
CPC .......... *H04L 12/4633* (2013.01); *H04L 45/74* (2013.01)

(58) Field of Classification Search
None
See application file for complete search history.

(56) References Cited

U.S. PATENT DOCUMENTS

| | | | |
|---|---|---|---|
| 7,724,732 B2 | 5/2010 | Guichard et al. | |
| 7,774,837 B2 | 8/2010 | McAlister | |
| 7,873,993 B2 | 1/2011 | King | |
| 10,255,164 B2* | 4/2019 | Lau | G06F 11/3698 |
| 10,785,683 B2* | 9/2020 | Zaks | H04L 9/3242 |
| 10,797,992 B2 | 10/2020 | Blair et al. | |
| 10,999,197 B2 | 5/2021 | Hooda et al. | |
| 2005/0223111 A1 | 10/2005 | Bhandaru et al. | |
| 2006/0056297 A1 | 3/2006 | Bryson et al. | |
| 2008/0222693 A1 | 9/2008 | McAlister | |
| 2018/0097722 A1* | 4/2018 | Callard | H04L 12/4641 |
| 2019/0141572 A1* | 5/2019 | Zaks | H04W 12/106 |
| 2020/0177629 A1 | 6/2020 | Hooda et al. | |
| 2020/0314057 A1* | 10/2020 | Hong | H04L 69/22 |
| 2021/0036987 A1 | 2/2021 | Mishra et al. | |
| 2021/0092208 A1* | 3/2021 | Dutta | H04L 69/326 |
| 2023/0216804 A1* | 7/2023 | Zohar | H04L 45/24 |
| | | | 709/238 |
| 2024/0023100 A1* | 1/2024 | Sun | H04W 72/1273 |

* cited by examiner

*Primary Examiner* — Phirin Sam
(74) *Attorney, Agent, or Firm* — Hewlett Packard Enterprise Patent Department (57) ABSTRACT

Implementations of the present disclosure relate to packet fragmentation in Generic Routing Encapsulation (GRE). A method comprises in accordance with a determination that the target packet is to be fragmented, generating at least two packets from the target packet. The at least two packets comprise an Internet Protocol (IP) header, a GRE header and a fragment of the payload of the target packet, respectively. The GRE header comprises a fragment indication indicating that the respective packet comprises a respective fragment of the payload of the target packet. The method further comprises transmitting the at least two packets to a second network device. In this way, the packet fragment dropping due to security policies will be avoided.

20 Claims, 8 Drawing Sheets

PACKET FRAGMENTATION IN GRE

BACKGROUND

In wireless communication networks, tunnels are widely used for transmissions between different network devices, such as between a controller and an access point (AP). The tunnel may be created under a tunneling protocol which enables traffic to be sent across the wireless network through encapsulation. For example, for campus AP (CAP), Generic Routing Encapsulation (GRE) tunnel is widely used to encapsulate the traffic into packets to be transmitted between AP and controller. Those packets with a larger size, such as jumbo packets need to be fragmented before transmitted in the tunnel. However, some security policies will block the packets fragmented in Internet Protocol (IP) level. Therefore, it is desirable to enhance the packet fragmentation under those security policies.

BRIEF DESCRIPTION OF THE DRAWINGS

Through the following detailed descriptions with reference to the accompanying drawings, the above and other objectives, features and advantages of the example implementations disclosed herein will become more comprehensible. In the drawings, several example implementations disclosed herein will be illustrated in an example and in a non-limiting manner, where.

DETAILED DESCRIPTION

Example implementations of the present disclosure relate to packet fragmentation in GRE. It is to be understood that these implementations are described only for the purpose of illustration and help those skilled in the art to understand and implement the present disclosure, without suggesting any limitation as to the scope of the disclosure. Implementations described herein can be implemented in various manners other than the ones described below.

As used herein, the term "communication network" refers to a network following any suitable communication standards, such as Institute of Electrical and Electronic Engineers (IEEE) 802.11 standards (such as IEEE 802.11ax standard (also referred to as Wi-Fi 6)), IEEE 802.3 standards, Wi-Fi Alliance Specifications, or any other wireless communication standards, and/or any other protocols either currently known or to be developed in the future. Implementations of the present disclosure may be applied in various communication systems. Given the rapid development in communications, there will of course also be future type communication technologies and systems with which the present disclosure may be implemented. It should not be seen as limiting the scope of the present disclosure to only the aforementioned system.

Figure 1:
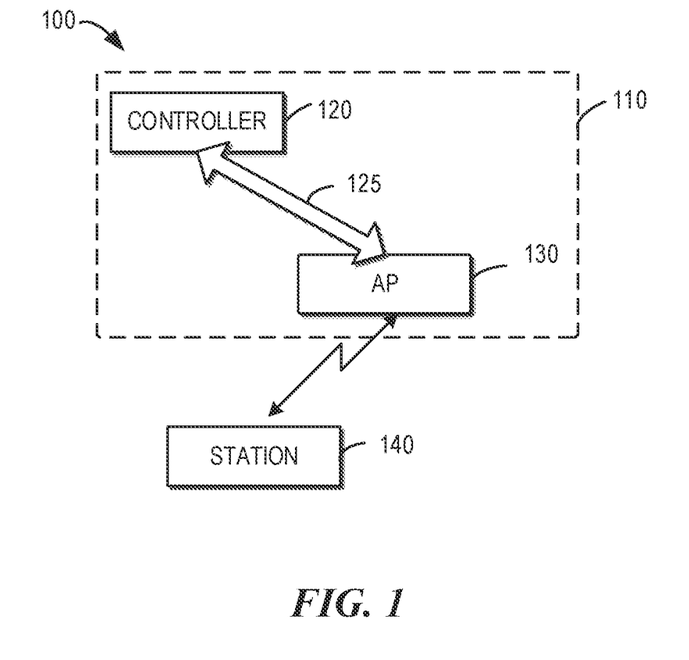
FIG. 1 illustrates an example communication environment in which example implementations of the present disclosure can be implemented.

FIG. 1 illustrates an example environment 100 in which example implementations of the present disclosure can be implemented. The example environment 100 may comprise at least a part of a wireless communication network 110 such as a WLAN. The example environment 100 also comprises a station 140 connected to the wireless communication network 110.

The station 140 may communicate with the wireless communication network 110 by communicating with the AP 130. The station 140 may also be referred to as a STA, a user device or a client (device). The station 140 may comprise any type of mobile device, fixed device, or portable device including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof.

The AP 130 may be any suitable device that allows the station 140 to connect to the wireless communication network 110 in the example environment 100. As used herein, the AP 130 may comprise, be implemented as, or known as a Radio Router, Radio Transceiver, switch, Wi-Fi hotspot device, Basic Service Set (BSS), Extended Service Set (ESS), Radio Base Station (RBS), or some other terminology.

Communications between the AP 130 and the station 140 may operate according to the wireless communication protocols such as Institute of Electrical and Electronic Engineers (IEEE) 802.11 standards, Wi-Fi Alliance Specifications, or any other wireless communication standards. The IEEE 802.11 standards may include the IEEE 802.11ax standard (also referred to as Wi-Fi 6), or any other wireless communication standards.

The wireless communication network 110 comprises a controller 120 and an AP 130. The controller 120 may also referred to as an AP controller or an access controller. The controller 120 may control at least one AP for example the AP 130. It is to be understood that the wireless communication network 110 may comprise additional network devices other than the controller 120 and the AP 130. Communications between the network devices such as between the AP 130 and the controller 120 may operate according to the wireless communication protocols such as IEEE 802.3 standards, IEEE 802.11 standards, Wi-Fi Alliance Specifications, or any other wireless communication standards or any other wireless communication standards.

Transmissions between the network devices for example between the controller 120 and the AP 130 are performed via a tunnel 125. For example, for campus AP cases, the tunnel 125 may comprise a GRE tunnel. In such cases, the GRE tunnel is used to encapsulate traffic into packets to transmit between the AP 130 and the controller 120. Alternatively, for remote AP cases, the tunnel 125 may also comprise an Internet Protocol Security (IPsec) tunnel. In such cases, the IPsec tunnel is used to encapsulate traffic between the AP 130 and the controller 120.

It is to be understood that the number of AP, controller, tunnel and station illustrated in FIG. 1 is only for the purpose of illustration without suggesting any limitations. The example environment 100 may include any suitable number of AP, controller, tunnel and station configured for implementing implementations of the present disclosure.

In some cases, packets with a larger size, such as jumbo packets need to be fragmented before transmitted in the tunnel. Conventionally, for campus AP cases, jumbo packets will be fragmented in IP level. However, some security sensitive scenarios refuse such fragmentation in IP level. For example, if customer applies some security policies against fragmentation such as IPv6 fragmentation, those fragmented packets will be dropped. Therefore, it is desirable to enhance the packet fragmentation under those security policies.

It has been propose to change the maximum transmission unit (MTU) of the tunnel to avoid the fragmentation. However, such approach leads to bigger packets and will be probably refused by the customer. It has also been proposed to switch the campus AP to the remote AP and apply the IPsec tunnel with no fragmentation to avoid the fragmented packet being blocked. However, such approach needs to switch the AP and may result in further limitations such as a lower throughput. Such approach cannot fit the throughput requirement, thus will not be accepted by the customer.

Various example implementations of the present disclosure propose a more efficient way to do fragmentation in GRE. According to the example implementations of the present disclosure, if a first network device determines, based on a payload of a target packet, that the target packet is to be fragment, the first network device generates at least two packets from the target packet. The at least two packets comprise an IP header, a GRE header and a fragment of the payload of the target packet, respectively. A fragment indication indicating that the respective packet comprises a respective fragment of the payload of the target packet is comprised in the GRE header instead of the IP header.

By comprising the fragment indication in the GRE header instead of the IP header, that is, doing fragmentation in the GRE header instead of in IP level, the fragmented packets will not be blocked by the security policies. In addition, the throughput will not be impacted.

Figure 2:
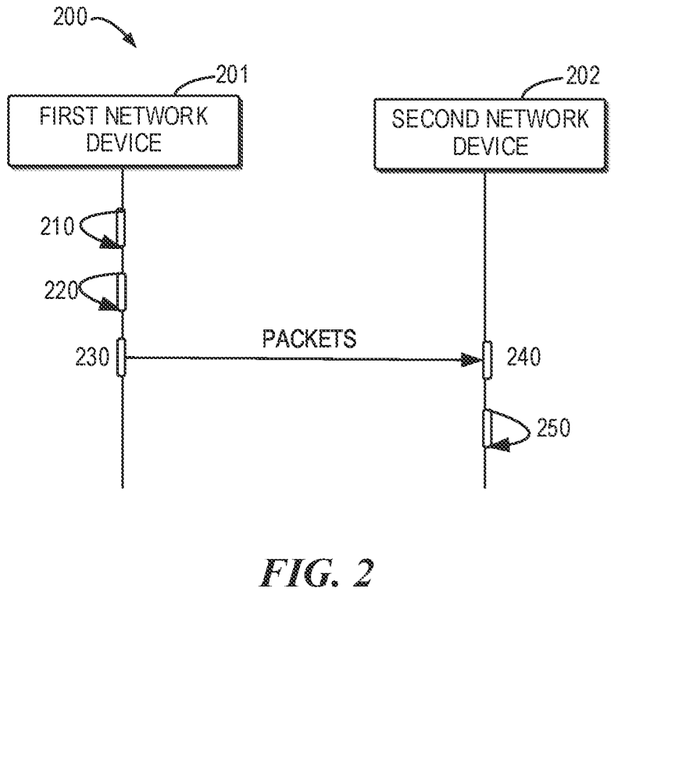
FIG. 2 illustrates a signaling flow for packet fragmentation in GRE in accordance with some example implementations of the present disclosure.

Some example implementations of the present disclosure will be discussed in detail below with reference to other figures. FIG. 2 illustrates a signaling flow 200 for packet fragmentation in GRE in accordance with some example implementations of the present disclosure. As illustrated in FIG. 2, the signaling flow 200 involves a first network device 201 and a second network device 202.

In some example implementations, the first network device 201 and the second network device 202 may comprise a campus AP and a controller for the AP. For example, the first network device 201 may comprise the controller 120 in FIG. 1 while the second network device 202 may comprise the AP 130 in FIG. 1. For another example, the first network device 201 may comprise the AP 130 in FIG. 1 while the second network device 202 may comprise the controller 120 in FIG. 1.

It is to be understood that the first network device 201 and the second network device 202 may further comprise any other suitable devices. It is to be understood that the signaling flow 200 may involves more devices or less devices, and the number of devices illustrated in FIG. 2 is only for the purpose of illustration without suggesting any limitations.

In operation, the first network device 201 determines 210 whether a target packet is to be fragmented at least in part based on a payload of the target packet. For example, the target packet may be a jumbo packet received at the first network device 210. In the cases where the first network device 201 comprises the controller 120, the target packet may be a packet received at the controller 120 which is target to the station 140 connecting to the AP 130. In such cases, the controller 120 may switch the packet from 802.3 format to 802.11 format and intends to send it to the AP 130. In the cases where the first network device 201 comprises the AP 130, the target packet may be a packet received at the AP 130 from the station 140 target to the controller 120. In such cases, the AP 130 may switch the packet from 802.11 format to 802.3 format and intends to send it to the controller 120.

In some example implementations, the first network device 201 may make the determination 210 based on a comparison between the payload of the target packet and a threshold payload size. For example, the first network device 201 may determine a sum of the size of the payload of the target packet and a size of the GRE header. The first network device 201 may compare the sum with the threshold payload size, for example the MTU size. If the sum is less than or equal to the MTU size, the first network device 201 may determine that the target packet will not be fragmented and will to transmit to the AP 130 directly. If the sum exceeds the MTU size, the first network device 201 may determine that the target packet is to be fragmented.

By making the determination 210 based on the comparison of the sum of the payload size and the GRE header with the threshold payload size, the size of each fragmented packet with the GRE header may be ensured to be not exceeding the permitted size.

In some example implementations, the first network device 201 may determine the number of fragmented packets of the target packet based on the comparison between the sum and the threshold payload size. For example, if the sum exceeds N times of the threshold payload size, then the number of the fragmented packets may be (N+1). N may be any suitable integer greater than or equal to 0. For example, if N is equal to 1, it means that the target packet will be fragmented into two fragmented packet. For another example, if N is equal to 0, it means that the target packet is of a smaller size and thus will not be fragmented. In this case, the first network device 201 may transmit the target packet directly to the second network device 202 without doing fragmentation.

If the first network device 201 determines 210 that the target packet is to be fragmented, the first network device 201 generates 220 at least two packets from the target packet. The at least two packets comprise an IP header, a GRE header and a fragment of the payload of the target packet, respectively. The GRE header (also referred to as an enhanced GRE header) comprises a fragment indication indicating that the respective packet comprises a respective fragment of the payload of the target packet. In the example where the first network device 201 determines that the number of fragmented packets is (N+1), the first network device 201 may generate (N+1) packets from the target packet.

Figure 3:
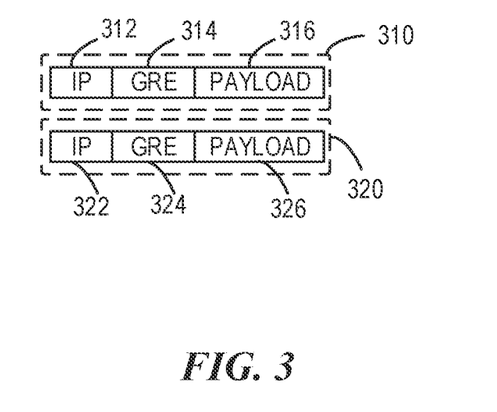
FIG. 3 illustrates example packets generated from a target packet in accordance with some example implementations of the present disclosure.

FIG. 3 illustrates example packet 310 and packet 320 generated from the target packet in accordance with some example implementations of the present disclosure. As illustrated in FIG. 3, the packet 310 comprises an IP header 312, a GRE header 314 and a payload 310. The payload 310 may be a first fragment of the payload of the target packet. The GRE header 314 comprises a fragment indication indicating that the packet 310 comprises the first fragment of the payload of the target packet. Likewise, the packet 320 comprises an IP header 322, a GRE header 324 and a payload 320. The payload 320 may be a second fragment of the payload of the target packet. The GRE header 324 comprises a fragment indication indicating that the packet 320 comprises the second fragment of the payload of the target packet. For the purpose of illustration, there are only two packets generated from the target packet shown in FIG. 3. It is to be understood that the target packet may be fragmented into more than two packets.

By using the fragmented packet as shown in FIG. 2, the first network device 201 may split the payload of the target packet first, and then add GRE header with the fragment indication for each payload, and add IP header ahead of the GRE header at last. That is, the packet fragmentation can be performed in GRE header. In this way, throughput won't be impacted and blocking fragment policies also won't be triggered.

As discussed above, the GRE header of the fragmented packet comprises the fragment indication. In some example implementations, the first network device 201 may determine an offset for each fragmented packet, such as the packets 310 and 320. The offset indicates a location of a respective fragment of the payload of the target packet. For example, the payload 316 of the packet 310 corresponds to a beginning fragment of the payload of the target packet. In such situation, the offset of the packet 310 may be equal to 0. For another example, the payload 326 of the packet 320 corresponds to a subsequent fragment after the beginning fragment of the payload of the target packet. In such situation, the offset of the packet 320 may be associated with the threshold payload size for example the MTU size. For example, in the example that the packet 310 is of 1500 bytes, then the offset of the packet 320 may be set to 185 octets.

Alternatively, or in addition, in some example implementations, the first network device 201 may determine the respective fragment as a respective payload of the packet. The first network device 201 may further generate the GRE header of the fragmented packet by comprising the offset as the fragment indication.

In some example implementations, the GRE header may comprise further information other than the fragmentation indication. For example, the first network device 201 may determine a fragment flag for each fragmented packet. The fragment flag indicates whether a further fragment of the payload of the target packet is after the fragment comprised in the fragmented packet. The first network device 201 may further generate the GRE header of the packet by comprising the fragment flag. For example, in the example of FIG. 3, the fragment flag of the packet 310 comprised in the GRE header 314 may indicate that there is a further fragment after the fragment comprised in the packet 310. By contrast, the fragment flag of the packet 320 comprised in the GRE header 324 may indicate that there is no further fragment.

In some example implementations, the first network device 201 may determine an order of the target packet of a plurality of packet to be transmitted by the first network device 201 to the second network device 202. Alternatively, or in addition, the first network device 201 may determine an identifier for each fragmented packet based on the order of the target packet. The identifier indicates that the fragmented packet belongs to the target packet with the determined order. The first network device 201 may generate the GRE header by comprising the identifier.

Figure 4:
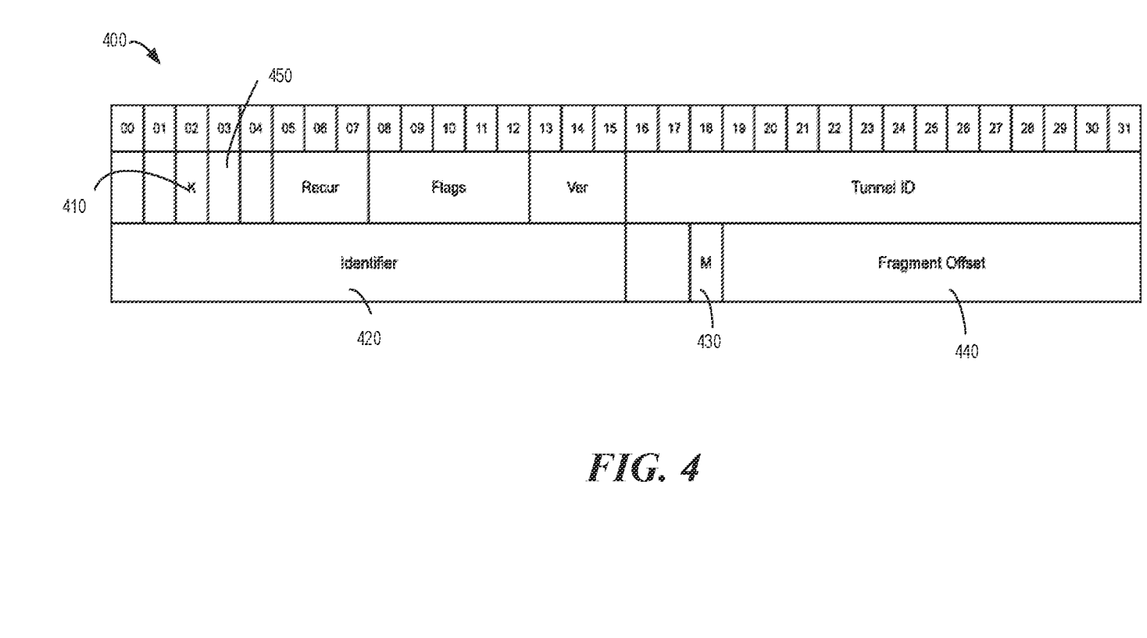
FIG. 4 illustrates an example GRE header in accordance with some example implementations of the present disclosure.

FIG. 4 illustrates an example GRE header 400 in accordance with some example implementations of the present disclosure. In the enhanced GRE header 400, Key Present 410 (bit 2) 410 is set or enabled. That is, the "Key field" is present in the GRE header. The Key field may be put followed Tunnel ID field.

In the Key field, bit 0 to bit 15 is Identifier 420. The Identifier 420 may be determined based on the order of the packets between the first and second network devices. For example, for those packets that are not fragmented from a target packet, the Identifier 420 may be increased by 1 for each GRE packet transmitted between the first and second network devices. For those fragmented packets from the same target packet, the Identifiers for them may be determined as the order of the beginning fragmented packet.

In some example embodiments, the history of Identifier 410 may be stored by the network device encapsulates the GRE header, for example the first network device 201. For example, in the case where the first network device 201 comprises the controller 120 while the second network device 202 comprises the AP 130, the controller 120 may transmit the packets (also referred to as downstream) to the AP 130, the controller 120 will store the Identifier of each packet. For another case where the first network device 201 comprises the AP 130 while the second network device 202 comprises the controller 120, the AP 130 may transmit the packets (also referred to as upstream) to the controller 120, the AP 130 will store the Identifier of each packet. By storing the identifiers separately at each network device, the identifiers in upstream and downstream are individual and can be counted begin from 1.

In the Key field, bit 16 to bit 17 is reserved. In the Key field, bit 18 is the fragment flag (also referred to as more fragment flag, or abbreviated as M) 430. If the fragment flag 430 is equal to 1, it means that there is more fragment(s) after the current packet. Otherwise, the fragment flag 430 equal to 0 represents that no more fragment after the current packet.

In the Key field, bit 19 to bit 31 is fragment offset 440 which indicates where the data gram this fragment belongs. The fragment offset 440 may be measured in units of 8 octets (64 bits). The beginning fragmented packet may have a fragment offset 0. In some example implementations, the fragment offset 440 may be determined as the fragment indication in the GRE header.

The GRE header 400 may also comprise additional field, such as Recur, Flags, Ver, etc. These additional fields may be set according to for example RFC1701, which will not be described in detail here.

It is to be understood that for those packets without fragmentation, they may also comprise the enhanced GRE header such as the GRE header 400. For example, in such cases, the Identifier 410 may be the order of the packet without fragmentation, the fragment flag 430 may be set to 0 (which means no more fragmented packet), and the fragment offset 440 may be set to 0.

FIG. 4 illustrates an example GRE header 400 with Key field present. Alternatively, in some example implementations, the GRE header 400 will set or enable Sequence Number Present (bit 3) 450 instead of the Key Present 410. In such cases, the sequence number field instead of the key field may be put followed the Tunnel ID field. The sequence number field may be similar to the key field, which will not be described in detail here. It is to be understood that the example GRE header 400 is only for the purpose of illustration, without suggesting any limitations. The GRE header may have other suitable format.

Referring back to FIG. 2, the first network device 201 transmits the at least two fragmented packets to the second network device 202. These at least two fragmented packets are IP packets without fragment indication or fragment information in the IP header. These at least two fragmented packets all have a GRE header comprising the fragment indication. In this way, these IP packets will not be blocked due to security policies as they do not have fragment indication or fragment information in the IP header.

The second network device 202 receives 240 the at least two fragmented packets from the first network device 201. For example, the AP 130 may receive the at least two fragmented packets from the controller 120. For another example, the controller 120 may receive the at least two fragmented packets from the AP 130.

The second network device 202 generates 250 the target packet from the at least two fragmented packets. For example, if the GRE headers of the at least two fragmented packets comprise a same identifier corresponding to the target packet, the second network device 202 may generate 250 the target packet from the at least two fragmented packets.

In some example implementations, the second network device 202 may generate the payload of the target packet at least based on the fragment and fragment indication of each of the at least two fragmented packets. For example, for each of the at least two fragmented packet, the second network device 202 may determine an offset of a respective fragment comprised in the fragmented packet based on a respective fragment indication comprised in a respective GRE header of the fragmented packet. For example, the offset may be comprised in the fragment offset 440 of the GRE header 400 in FIG. 4. The second network device 202 may further generate the payload of the target packet by adding the respective fragment at a location indicated by the offset.

In the example in FIG. 3, the packet 310 may have an offset 0 while the packet 320 may have an offset 185, the payload of the target packet may be generated by adding the payload 316 of the packet 310 at the beginning, and then adding the payload 326 of the packet 320 after the payload 316.

In some example implementations, the second network device 202 may also determine whether the current fragmented packet is the last fragmented packet associated with the target packet based on the GRE header of the current fragmented packet. For example, if the GRE header of the current fragmented packet comprises a fragment flag indicating that there is no more fragmented packet, then the second network device 202 may determine that the current fragmented packet is the last fragmented packet. The fragment flag combining with the offset information comprised in the GRE header will ensure that all the fragmented packets associated with a certain target packet.

In some example implementations, the second network device 202 may transmit the generated target packet to a target device. For example, the AP 130 may transmit the generated target packet to the station 140.

In some example implementations, the second network device 202 may further receive, from the first network device 201, a further packet. The further packet comprises a further GRE header indicating a further identifier of the further packet. The further identifier is different from the identifier of the at least two fragmented packets. That is, the further packet is not a fragmented packet of the target packet. The further packet may be a packet without fragmentation, or a fragmented packet of a further target packet. The second network device 202 may determine order of the at least two fragmented packets and the further packet based on the identifier of the at least two fragmented packets and the further identifier of the further packet.

For example, if the identifier of the at least two fragmented packets is less than the further identifier of the further packet, the second network device 202 may determine that the further packet is transmitted after the at least two fragmented packets. Otherwise, if the identifier of the at least two fragmented packets is greater than the further identifier of the further packet, the second network device 202 may determine that the further packet is transmitted before the at least two fragmented packets.

For example, in the case where the first network device 201 comprises the controller 120 and the second network device 130 comprises the AP 130, the controller 120 sends out 10 packets to the station 140. The fifth and sixth packets in the 10 packets are fragmented packets, while other packets are packets without fragmentation. In such situation, the Identifiers of these 10 packets maybe as follows: 1/2/3/4/5/5/6/7/8/9. These two Identifiers equal to 5 represents two fragmented packets associated with a target packet. In some situations, the order of these 10 packets received at the AP will be different with the above order. For example, the AP 130 may receive these 10 packets with Identifiers 1/2/4/3/6/5/5/8/7/9.

In such situation, the conventional approach for example fragmentation in IP level will not store the Identifier of each packet, thus the AP 130 may not reorder these packets. As a result, the station 140 may drop these packets because they are in a wrong order.

With the present solution, by comprising the Identifier (or the order information) of each packet in the GRE header, the AP 130 may reorder these 10 packets based on the Identifiers comprised in the GRE header of each packet. The AP 130 may further determine the order of these fragmented packets based on the fragment offsets. In addition, the AP 130 may transmit the reordered packets to the station 140 with the correct order.

Example implementations regarding reordering the received packets at the AP 130 have been described above. It is to be understood that at the controller 120, similar process will be performed to reorder received packets from the AP 130.

By doing packet fragmentation in GRE, security policies such as fragment checking policies in network may be avoided. Meanwhile, the throughput will not be affected. Moreover, it may also avoid client packets dropping caused by out of order.

Figure 5:
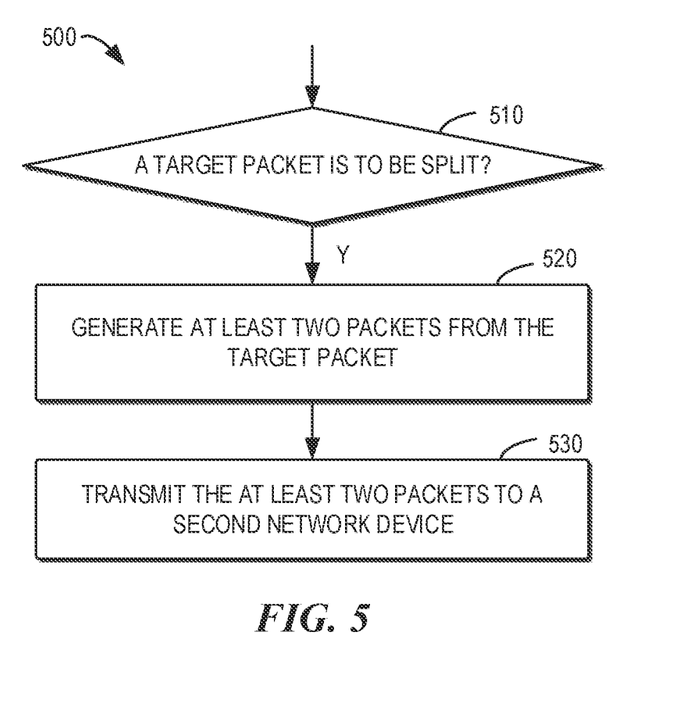
FIG. 5 illustrates a flowchart of a method in accordance with some example implementations of the present disclosure.

FIG. 5 illustrates a flowchart of a method 500 in accordance with some example implementations of the present disclosure. The method 500 can be carried out by the first network device 201 according to the implementations described herein. While only some blocks are shown in the method 500, the method 500 may comprise other operations described herein.

At 510, the first network device 201 determines whether a target packet is to be fragmented at least in part based on a payload of the target packet. In some example implementations, in determining whether the target packet is to be fragmented, the first network device 201 may determine a sum of a size of the payload of the packet and a size of the GRE header. The first network device 201 may further determine whether the target packet is to be fragmented based on a comparison between the sum and a threshold payload size.

If the first network device 201 determines that the target packet is to be fragmented, the first network device 201, at 520, generates at least two packets from the target packet. The at least two packets comprise an Internet Protocol (IP) header, a Generic Routing Encapsulation (GRE) header and a fragment of the payload of the target packet, respectively. The GRE header comprises a fragment indication indicating that the respective packet comprises a respective fragment of the payload of the target packet.

In some example implementations, in generating the at least two packets from the target packet, for each packet of the at least two packet, the first network device 201 may determine an offset for the packet. The offset indicates a location of a respective fragment of the payload of the target packet. The first network device 201 may further generate the GRE header of the packet by comprising the offset as the fragment indication; and determine the respective fragment as a respective payload of the packet.

In some example implementations, in generating the at least two packets from the target packet, for each packet of the at least two packets, the first network device 201 may determine a fragment flag. The fragment flag indicates whether a further fragment of the payload is after the fragment comprised in the packet. The first network device 201 may further generate the GRE header of the packet by comprising the fragment flag.

In some example implementations, the first network device 201 may determine an order of the target packet of a plurality of packet to be transmitted by the first network device 201 to the second network device 202. In some example implementations, in generating the at least two packets from the target packet, for each packet of the at least two packets, the first network device 201 may determine an identifier for the packet based on the order of the target packet. The identifier indicates that the packet belongs to the target packet with the determined order. The first network device 201 may generate the GRE header by comprising the identifier.

At 530, the first network device 201 transmits the at least two packets to the second network device 202. In some example implementations, the first network device 201 may comprise a controller, for example the controller 120 in FIG. 1 while the second network device 202 may comprise an AP, for example the AP 130 in FIG. 1. Alternatively, or in addition, in some example implementations, the first network device 201 may comprise an AP, for example the AP 130 in FIG. 1 while the second network device 202 may comprise a controller, for example the controller 120 in FIG. 1.

Figure 6:
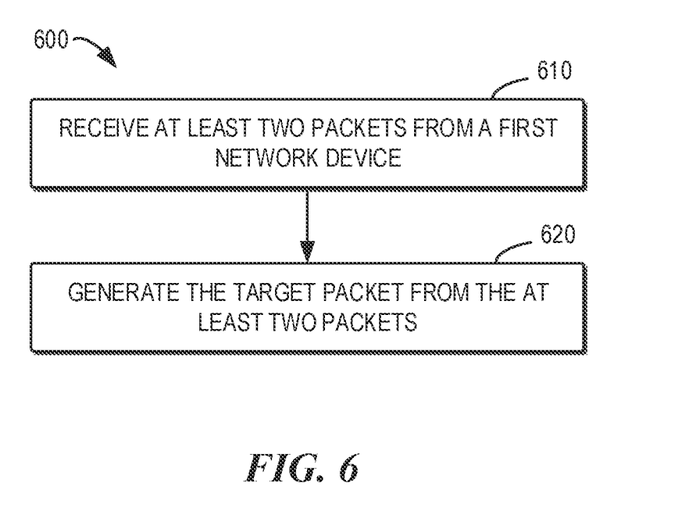
FIG. 6 illustrates another flowchart of a method in accordance with some example implementations of the present disclosure.

FIG. 6 illustrates a flowchart of a method 600 in accordance with some example implementations of the present disclosure. The method 600 can be carried out by the second network device 202 according to the implementations described herein. While only some blocks are shown in the method 600, the method 600 may comprise other operations described herein.

At 610, the second network device 202 receives, from the first network device 201, at least two packets. The at least two packets comprise an Internet Protocol (IP) header, a Generic Routing Encapsulation (GRE) header and a fragment of a payload of a target packet, respectively. The GRE header comprises a fragment indication indicating that the respective packet comprises a fragment of the payload of the target packet.

At 620, the second network device 202 generates the target packet from the at least two packets. In some example implementations, in generating the target packet, in accordance with a determination that the GRE headers of the at least two packets comprise a same identifier corresponding to the target packet, the second network device 202 may generate the target packet from the at least two packets.

In some example implementations, the second network device 202 may further receive, from the first network device 201, a further packet. The further packet comprises a further GRE header indicating a further identifier of the further packet. The further identifier is different from the identifier of the at least two packets. The second network device 202 may further determine order of the at least two packets and the further packet based on the identifier and the further identifier.

In some example implementations, in determining the order of the at least two packets and the further packet, the second network device 202 may in accordance with a determination that the identifier is less than the further identifier, determine that the further packet is transmitted after the at least two packets.

In some example implementations, in generating the target packet, the second network device 202 may generate a payload of the target packet at least based on the fragment and fragment indication of each of the at least two packets. In some example implementations, in generating the payload of the target packets the second network device 202 may for each of the at least two packets, determine an offset of a respective fragment comprised in the packet based on a respective fragment indication comprised in a respective GRE header of the packet; and generate the payload by adding the respective fragment at a location indicated by the offset.

In some example implementations, the first network device 201 may comprise a controller, for example the controller 120 in FIG. 1 while the second network device 202 may comprise an AP, for example the AP 130 in FIG. 1. Alternatively, or in addition, in some example implementations, the first network device 201 may comprise an AP, for example the AP 130 in FIG. 1 while the second network device 202 may comprise a controller, for example the controller 120 in FIG. 1.

It is to be understood that the method 500 and the method 600 may be performed separately or in combination. For example, the controller 120 may be configured to perform both the method 500 and the method 600. Likewise, the AP 130 may be configured to perform both the method 500 and the method 600.

Figure 7:
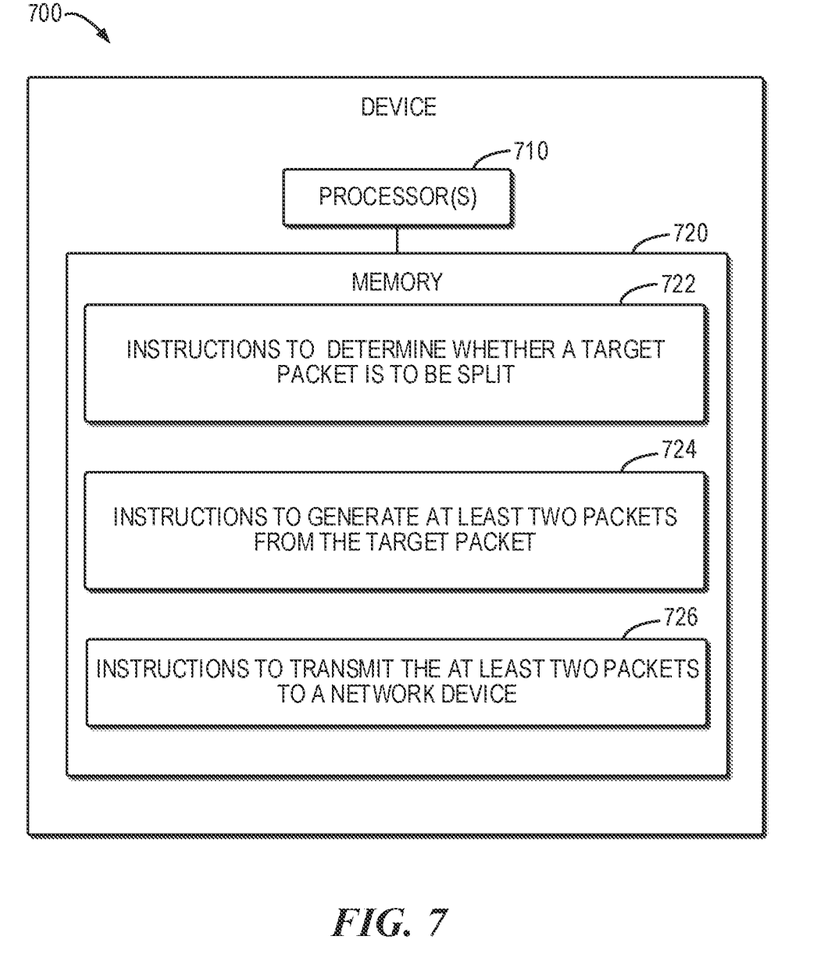
FIG. 7 illustrates a block diagram of a communication device in accordance with some example implementations of the present disclosure.

FIG. 7 illustrates a block diagram of an example device 700 in accordance with some example implementations of the present disclosure. The device 700 comprises at least one processor 710 and a memory 720 coupled to the at least one processor 710. The memory 720 stores instructions to cause the at least one processor 710 to implement acts of a method.

As illustrated in FIG. 7, the memory 720 stores instructions 722 to determine whether a target packet is to be fragmented at least in part based on a payload of the target packet. In some example implementations, the instructions 722 to determine whether a target packet is to be fragmented comprise instructions to, determine a sum of a size of the payload of the packet and a size of the GRE header, and to determine whether the target packet is to be fragmented based on a comparison between the sum and a threshold payload size.

The memory 720 further stores instructions 724 to generate at least two packets from the target packet in accordance with a determination that the target packet is to be fragmented. The at least two packets comprise an Internet Protocol (IP) header, a Generic Routing Encapsulation (GRE) header and a fragment of the payload of the target packet, respectively. The GRE header comprises a fragment indication indicating that the respective packet comprises a respective fragment of the payload of the target packet.

In some example implementations, the instructions 724 to generate the at least two packets comprise instructions to for each packet of the at least two packet, determine an offset for the packet. The offset indicates a location of a respective fragment of the payload of the target packet. The instructions 724 to generate the at least two packets further comprise instructions to generate the GRE header of the packet by comprising the offset as the fragment indication; and determine the respective fragment as a respective payload of the packet In some example implementations, the instructions 724 to generate the at least two packets comprise instructions to for each packet of the at least two packets, determine a fragment flag. The fragment flag indicates whether a further fragment of the payload is after the fragment comprised in the packet. The instructions 724 to generate the at least two packets further comprise instructions to generate the GRE header of the packet by comprising the fragment flag.

In some example implementations, the memory 720 further stores instructions to determine an order of the target packet of a plurality of packet to be transmitted by the device 700 to the network device. In some example implementations, instructions 724 to generate the at least two packets comprise instructions to for each packet of the at least two packets, determine an identifier for the packet based on the order of the target packet. The identifier indicates that the packet belongs to the target packet with the determined order. The instructions 724 to generate the at least two packets further comprise instructions to generate the GRE header by comprising the identifier.

The memory 720 further stores instructions 726 to transmit, to a network device, the at least two packets.

Figure 8:
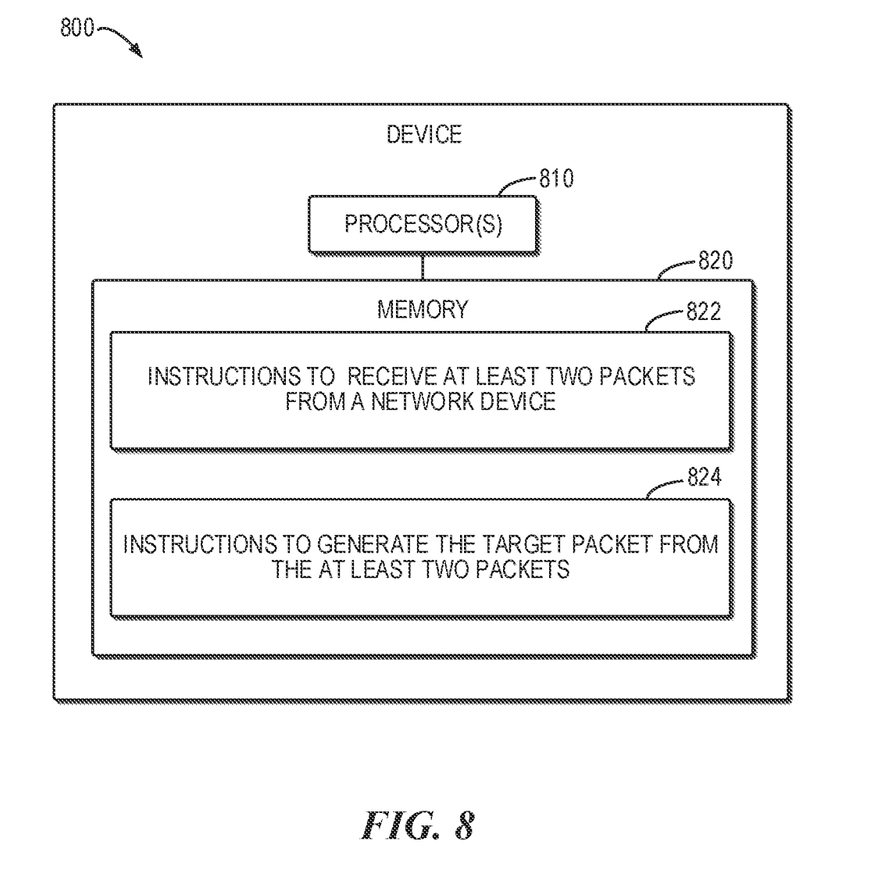
FIG. 8 illustrates another block diagram of a communication device in accordance with some example implementations of the present disclosure.

FIG. 8 illustrates a block diagram of an example device 800 in accordance with some example implementations of the present disclosure. The device 800 comprises at least one processor 810 and a memory 820 coupled to the at least one processor 810. The memory 820 stores instructions to cause the at least one processor 810 to implement acts of a method.

As illustrated in FIG. 8, the memory 820 stores instructions 822 to receive, from a network device, at least two packets. The at least two packets comprise an Internet Protocol (IP) header, a Generic Routing Encapsulation (GRE) header and a fragment of a payload of a target packet, respectively. The GRE header comprises a fragment indication indicating that the respective packet comprises a fragment of the payload of the target packet.

The memory 820 further stores instructions 824 to generate the target packet from the at least two packets. In some example implementations, instructions 824 to generate the target packet comprise instructions to generate the target packet from the at least two packets in accordance with a determination that the GRE headers of the at least two packets comprise a same identifier corresponding to the target packet.

In some example implementations, the memory 820 further store instructions to receive, from the network device, a further packet. In some example implementations, the further packet comprises a further GRE header indicating a further identifier of the further packet. In some example implementations, the further identifier is different from the identifier of the at least two packets. In some example implementations, the memory 820 further store instructions to determine order of the at least two packets and the further packet based on the identifier and the further identifier.

In some example implementations, the instructions to determine order of the at least two packets and the further packet comprise in accordance with a determination that the identifier is less than the further identifier, determine that the further packet is transmitted after the at least two packets.

In some example implementations, instructions 824 to generate the target packet comprise instructions to generate a payload of the target packet at least based on the fragment and fragment indication of each of the at least two packets. In some example implementations, instructions to generating the payload of the target packets comprise instructions to for each of the at least two packets, determine an offset of a respective fragment comprised in the packet based on a respective fragment indication comprised in a respective GRE header of the packet; and generate the payload by adding the respective fragment at a location indicated by the offset.

It is to be understood that although the device 700 and device 800 are illustrated as separate devices, in some example implementations, the devices 700 and 800 can be combined into one device, that is, a combined device with a memory storing the instructions 722, 724, 76, 822 and 844. The memory of the combined device may also store any further instructions describing with respect to FIGS. 7-8 above.

While the above discussion used a Wi-Fi communication standard as an illustrative example, in other implementations a wide variety of communication standards and, more generally, wireless communication technologies may be used. Furthermore, while some of the operations in the foregoing implementations were implemented in hardware or software, in general the operations in the preceding implementations can be implemented in a wide variety of configurations and architectures. Therefore, some or all of the operations in the foregoing implementations may be performed in hardware, in software or both.

It should be noted that specific terms disclosed in the present disclosure are proposed for convenience of description and better understanding of example implementations of the present disclosure, and the use of these specific terms may be changed to another format within the technical scope or spirit of the present disclosure.

Program codes or instructions for carrying out methods of the present disclosure may be written in any combination of one or more programming languages. These program codes or instructions may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code or instructions may execute entirely on a machine, partly on the machine, as a stand-alone software package, partly on the machine and partly on a remote machine or entirely on the remote machine or server.

In the context of this disclosure, a computer-readable medium may be any tangible medium that may contain, or store a program for use by or in connection with an instruction execution system, apparatus, or device. The computer-readable medium may be a computer-readable signal medium or a computer-readable storage medium. A computer-readable medium may include but not limited to an electronic, magnetic, optical, electromagnetic, infrared, or semiconductor system, apparatus, or device, or any suitable combination of the foregoing. More specific examples of the computer-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Certain features that are described in the context of separate implementations may also be implemented in combination in a single implementation. Conversely, various features that are described in the context of a single implementation may also be implemented in multiple implementations separately or in any suitable sub-combination.

In the foregoing Detailed Description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

What is claimed is:

1. A method comprising:
   determining, at a first network device, whether a target packet is to be fragmented at least in part based on a payload of the target packet;
   in accordance with a determination that the target packet is to be fragmented, generating at least two packets from the target packet, the at least two packets comprising an Internet Protocol (IP) header, a Generic Routing Encapsulation (GRE) header and a fragment of the payload of the target packet, respectively, the GRE header comprising a fragment indication indicating that the respective packet comprises a respective fragment of the payload of the target packet; and
   transmitting the at least two packets to a second network device.

2. The method of claim 1, wherein generating the at least two packets from the target packet comprises:
   for each packet of the at least two packets,
      determining an offset for the packet, the offset indicating a location of a respective fragment of the payload of the target packet;
      generating the GRE header of the packet by comprising the offset as the fragment indication; and
      determining the respective fragment as a respective payload of the packet.

3. The method of claim 1, wherein generating the at least two packets from the target packet comprises:
   for each packet of the at least two packets,
      determining a fragment flag, the fragment flag indicating whether a further fragment of the payload is after the fragment comprised in the packet; and
      generating the GRE header of the packet by comprising the fragment flag.

4. The method of any of claim 1, further comprising:
   determining an order of the target packet of a plurality of packet to be transmitted by the first network device to the second network device; and
   wherein generating the at least two packets from the target packet comprises:
      for each packet of the at least two packets,
         determining an identifier for the packet based on the order of the target packet, the identifier indicating that the packet belongs to the target packet with the determined order; and
         generating the GRE header by comprising the identifier.

5. The method of claim 1, wherein determining whether the target packet is to be fragmented comprises:
   determining a sum of a size of the payload of the packet and a size of the GRE header; and
   determining, whether the target packet is to be fragmented based on a comparison between the sum and a threshold payload size.

6. The method of claim 1, wherein the first network device comprises a controller, and the second network device comprises an access point (AP); or
   wherein the first network device comprises an AP and the second network device comprises a controller.

7. A method comprising:
   receiving, at a second network device and from a first network device, at least two packets, the at least two packets comprising an Internet Protocol (IP) header, a Generic Routing Encapsulation (GRE) header and a fragment of a payload of a target packet, respectively, the GRE header comprising a fragment indication indicating that the respective packet comprises a fragment of the payload of the target packet; and
   generating the target packet from the at least two packets.

8. The method of claim 7, wherein generating the target packet comprises:
   in accordance with a determination that the GRE headers of the at least two packets comprise a same identifier corresponding to the target packet, generating the target packet from the at least two packets.

9. The method of claim 8, further comprising:
   receiving, from the first network device, a further packet, the further packet comprising a further GRE header indicating a further identifier of the further packet, the further identifier being different from the identifier of the at least two packets; and
   determining order of the at least two packets and the further packet based on the identifier and the further identifier.

10. The method of claim 9, wherein determining the order of the at least two packets and the further packet comprises:
    in accordance with a determination that the identifier is less than the further identifier, determining that the further packet is transmitted after the at least two packets.

11. The method of claim 7, wherein generating the target packet comprises:
    generating a payload of the target packet at least based on the fragment and fragment indication of each of the at least two packets.

12. The method of claim 11, wherein generating the payload of the target packet comprises:
    for each of the at least two packets,
       determining an offset of a respective fragment comprised in the packet based on a respective fragment indication comprised in a respective GRE header of the packet; and
       generating the payload by adding the respective fragment at a location indicated by the offset.

13. The method of claim 7, wherein the first network device comprises a controller, and the second network device comprises an access point (AP); or
wherein the first network device comprises an AP and the second network device comprises a controller.

14. A network device comprising:
at least one processor; and
a memory coupled to the at least one processor, the memory storing instructions to cause the at least one processor to implement acts comprising:
  determining whether a target packet is to be fragmented at least in part based on a payload of the target packet;
  in accordance with a determination that the target packet is to be fragmented, generating at least two packets from the target packet, the at least two packets comprising a Generic Routing Encapsulation (GRE) header and a fragment of the payload of the target packet, respectively, the GRE header comprising a fragment indication indicating that the respective packet comprises a respective fragment of the payload of the target packet; and
  transmitting the at least two packets to a further network device.

15. The network device of claim 14, wherein generating the at least two packets from the target packet comprises:
for each packet of the at least two packets,
  determining an offset for the packet, the offset indicating a location of a respective fragment of the payload of the target packet;
  determining the GRE header of the packet by comprising the offset as the fragment indication;
  determining the respective fragment as a respective payload of the packet; and
  generating the packet by adding an Internet Protocol (IP) header, the GRE header and the respective payload.

16. The network device of claim 14, wherein generating the at least two packets from the target packet comprises:
for each packet of the at least two packets,
  determining a fragment flag, the fragment flag indicating whether a further fragment of the payload is after the fragment comprised in the packet; and
  generating the GRE header of the packet by comprising the fragment flag.

17. The network device of claim 14, wherein the acts further comprises:
determining an order of the target packet of a plurality of packet to be transmitted by the network device to the further network device; and
wherein generating the at least two packets from the target packet comprises:
for each packet of the at least two packets,
  determining an identifier for the packet based on the order of the target packet, the identifier indicating that the packet belongs to the target packet with the determined order; and
  generating the GRE header by comprising the identifier.

18. The network device of claim 14, wherein determining whether the target packet is to be fragmented comprises:
determining a sum of a size of the payload of the packet and a size of the GRE header; and
determining, whether the target packet is to be fragmented based on a comparison between the sum and a threshold payload size.

19. The network device of claim 14, wherein the act further comprises:
receiving, from the further network device, at least two further packets, the at least two further packets comprising an Internet Protocol (IP) header, a Generic Routing Encapsulation (GRE) header and a fragment of a payload of a further target packet, respectively, the GRE header comprising a fragment indication indicating that the respective further packet comprises a fragment of the payload of the further target packet; and
generating the further target packet from the at least two further packets.

20. The network device of claim 14, wherein generating the further target packet comprises:
generating a payload of the further target packet at least based on the fragment and fragment indication of each of the at least two further packets.

* * * * *